United States Patent

[11] 3,552,396

| [72] | Inventors | Robert B. Gerhardt<br>Birmingham;<br>Ralph L. Tweedale, Southfield, Mich. |
|---|---|---|
| [21] | Appl. No. | 677,356 |
| [22] | Filed | Oct. 23, 1967 |
| [45] | Patented | Jan. 5, 1971 |
| [73] | Assignee | Massey - Ferguson Inc.<br>Detroit, Mich. |

[54] POWER ADJUSTED CONCAVE
12 Claims, 3 Drawing Figs.

| [52] | U.S. Cl. | 130/27 |
|---|---|---|
| [51] | Int. Cl. | A01f 12/24 |
| [50] | Field of Search | 130/27.9, 27.9T, 27.10, 27.11, 27.16, 27.35; 56/21, 20 |

[56] References Cited
UNITED STATES PATENTS
2,931,363  4/1960  Bulin............................ 130/27.16

FOREIGN PATENTS
770,353  3/1957  Great Britain................ 130/27.16
234,307  6/1961  Australia....................... 130/27.11

*Primary Examiner*—Antonio F. Guida
*Attorney*—Gerhardt, Greenlee & Farris

ABSTRACT: A hydraulically adjustable concave for the threshing assembly of an agricultural combine. A hydraulic ram is connected with the concave through a linkage, and a movable control valve element actuates the ram to raise and lower the concave. In one embodiment, a warning signal responds to overloading. A second embodiment includes a followup control system in which the concave automatically moves away from the concave on overload and returns to a preset position when the obstruction causing the overload has passed from between the concave and cylinder.

INVENTORS.
ROBERT B. GERHARDT
BY RALPH L. TWEEDALE
Tweedale & Gerhardt
ATTORNEYS.

POWER ADJUSTED CONCAVE

This invention relates generally to threshing apparatus and is particularly concerned with an arrangement for controlling the spacing between the concave and threshing cylinder or drum during harvesting and threshing operations.

During harvesting and threshing operations with agricultural combines, it is not uncommon for excessive wads or slugs of crop material, or foreign objects such as rocks or stones, to enter the space between the concave and cylinder and overload the threshing apparatus. When this occurs in conventional combines, it requires the operator to stop the machine, dismount, manually release the concave, remove the obstruction from between the cylinder and concave, and return the concave to its operative position.

It is therefore one of the objects of this invention to provide a threshing assembly for combines in which the concave position can be controlled from the operator's platform.

Another object is to provide threshing apparatus in which the concave position can be power adjusted by remote control.

Another object is to provide threshing apparatus in which the normal operating position of the concave relative to the threshing cylinder or drum can be determined by remote control from an operator's station, and in which the concave will separate from the threshing cylinder upon overload and automatically return to its operating position when the overload is relieved.

In achievement of the foregoing, and other objects, a concave is mounted beneath a threshing drum or cylinder in such a manner that it can be selectively moved toward and away from the cylinder. Interconnected with the concave is a power element, preferably in the form of a hydraulic ram, which extends to move the concave in one direction relative to the cylinder, and retracts to move the concave in the opposite direction. The hydraulic ram is controlled by a valve movable between supply, neutral and discharge positions to respectively deliver hydraulic fluid to extend the ram, block flow of hydraulic fluid to and from the ram, and connect the ram with sump permitting it to retract. The valve controls, along with a concave position indicator are accessible to the operator at the operator's station.

In one embodiment, a warning signal is actuated by a pressure switch in response to overload on the concave.

In another embodiment, the valve controls are interconnected with the concave to provide a followup system. After the normal operating position has been determined by the operator, overload on the concave will cause the ram to move the concave away from the cylinder to permit the obstruction to pass between the concave and cylinder, after which the concave will automatically return to its normal operating position.

Other objects, advantages and features of the invention will become apparent from the following description taken in connection with the accompanying drawings in which.

Figure 1:
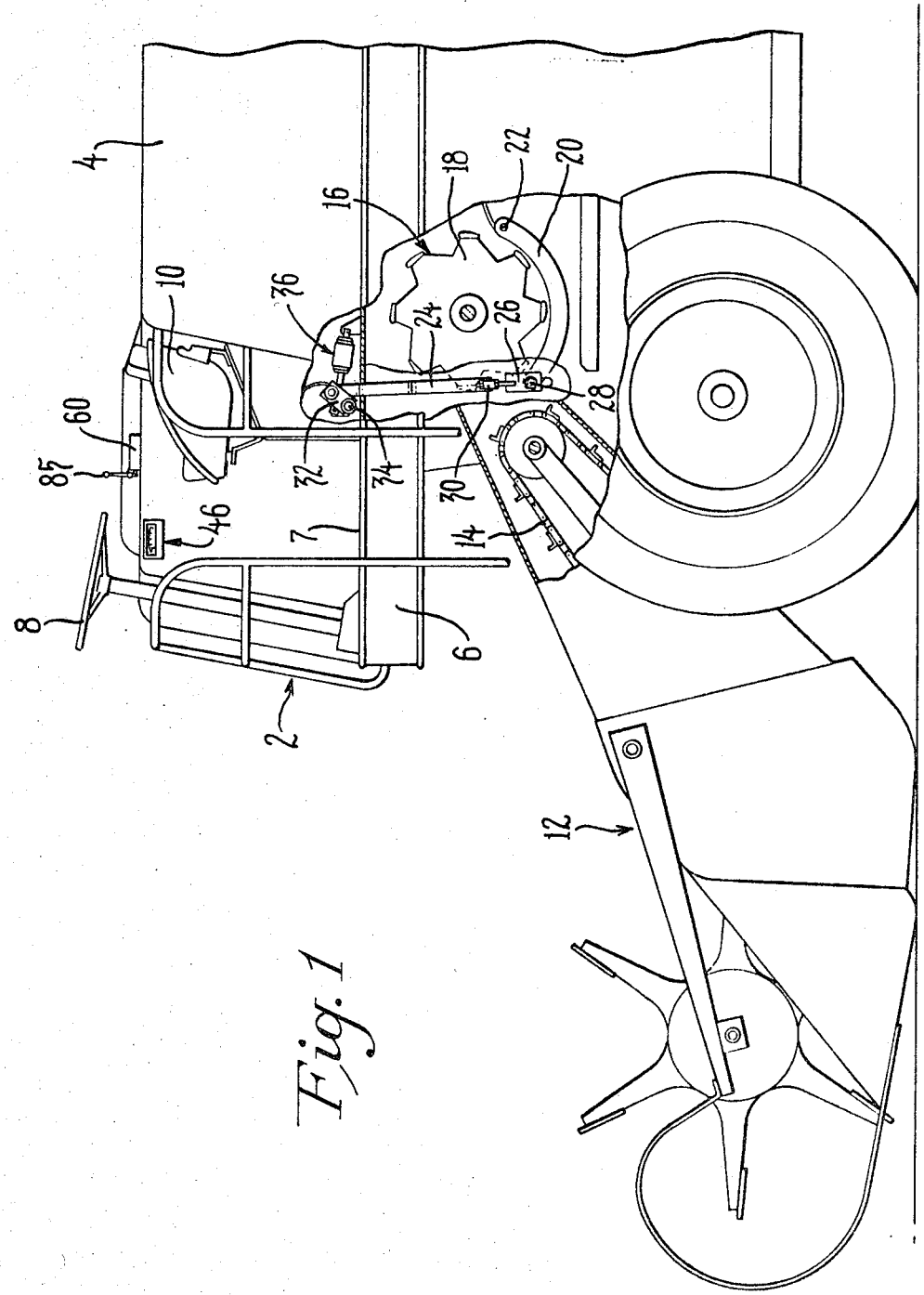
FIG. 1 is a partial elevational view of a combine with parts broken away to expose the threshing mechanism.

In FIG. 1, reference numeral 2 collectively designates an agricultural combine having a wheeled main body 4 formed with a horizontal deck 7 extending over an operator's platform 6. The operator's platform supports a steering wheel 8 and seat 10. Projecting forwardly from the main body is a conventional crop harvesting header 12 with a feed elevator 14 for feeding harvested crop material to a threshing assembly 16.

Figure 2:
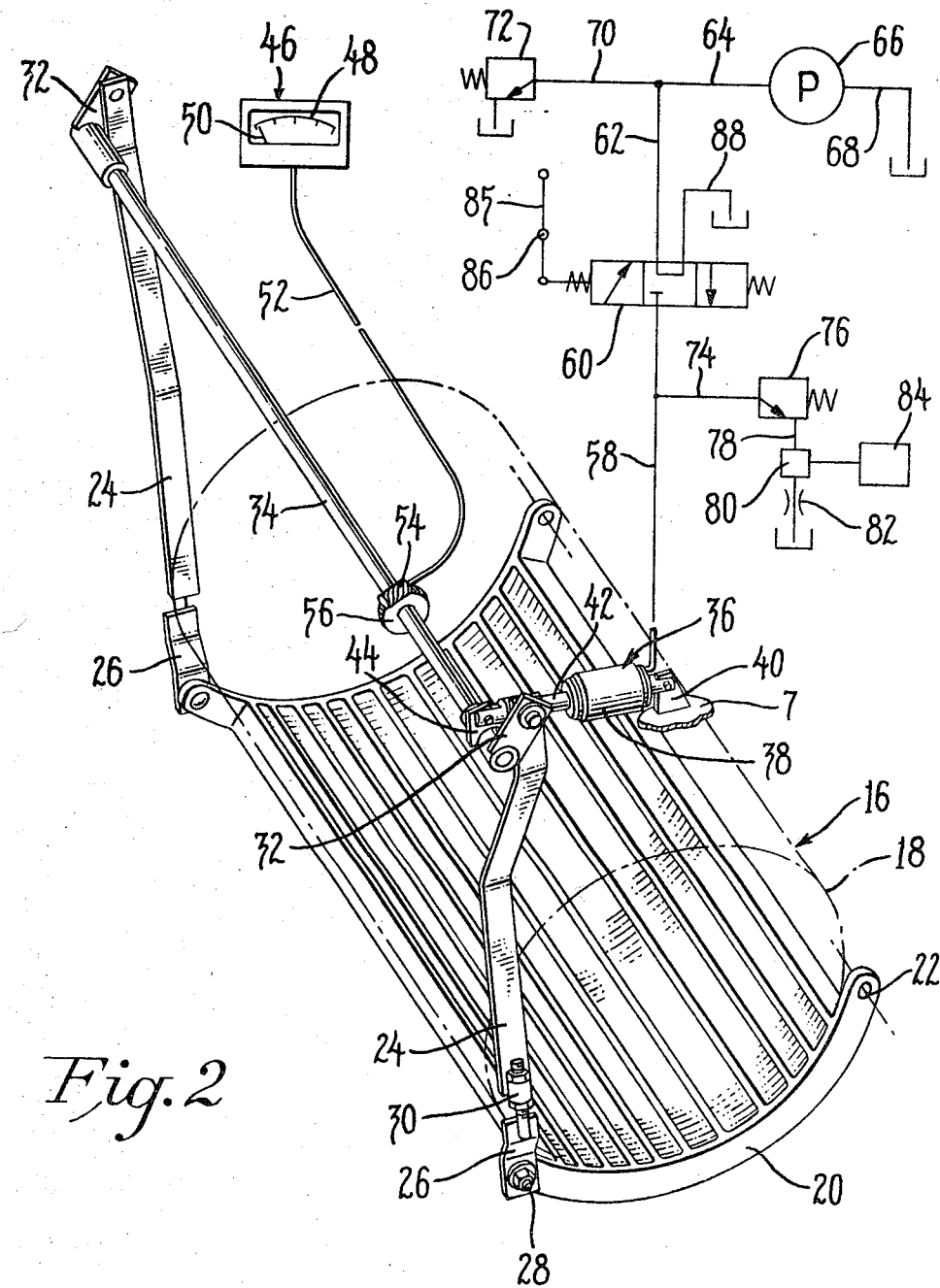
FIG. 2 is a perspective view of one embodiment of the threshing mechanism with the controls indicated diagrammatically.

With reference to FIG. 2, the threshing assembly 16 includes a conventional threshing cylinder or drum 18 and a concave 20 which cooperates with the threshing cylinder 18 in a conventional manner to separate grain from harvested crop material. Concave 20 is mounted for pivotal movement about an axis 22 so that it can move toward and away from threshing cylinder 18 about the pivotal axis 22. The forward end of concave 20 is supported on the lower, adjustable portion 26 of a lift link 24. The lower portion 26 of link 24 is pivotally connected by pins or bolts 28 to the forward end of concave 20 and is secured to the upper portion of the lift link by an adjustment mechanism 30. The adjustment mechanism 30 is fully described in the copending application of Walter Hirsch entitled, "Adjustable Concave," filed on the even date herewith, Ser. No. 678,161.

The upper end of link 24 is pivotally connected to a lever 32 nonrotatably mounted on a shaft 34 supported above deck 7. Rotation of shaft 34 in a clockwise direction as viewed from the right, or near end in FIG. 2 lowers the forward end of concave 20 to increase the spacing between the concave and threshing cylinder. Shaft 34 is caused to rotate by an extensible and retractable power element in the form of a hydraulic ram 36. Ram 36 has a cylinder 38 pivotally mounted on a support arm 40 projecting upwardly from deck 7, and a piston 42 reciprocably mounted in cylinder 38 pivotally connected with a lever 44 nonrotatably mounted on shaft 34. Extension of ram 36 causes counterclockwise rotation of shaft 34 to move concave 20 clockwise about axis 22 and decrease the space between the threshing cylinder and concave. Conversely, retraction of piston 42 within cylinder 38 causes counterclockwise movement of concave 20 about axis 22 to increase the space between the threshing cylinder and concave.

A concave position indicator designated generally be reference numeral 46 is mounted near seat 8 at the operator's station to indicate the position of concave 20 relative to the threshing cylinder. The concave position indicator includes a scale 48 and a movable pointer 50. Pointer 50 is operated through a flexible drive shaft 52 connected with a worm 54 engaged with a gear 56 nonrotatably mounted on shaft 34. Consequently, the position of pointer 50 relative to the indicia of scale 48 is determined by the position of concave 20 relative to the threshing cylinder 18.

Cylinder 38 of the hydraulic ram 36 is hydraulically connected through a line or conduit 58 with a movable control valve 60. Control valve 60 in turn is connected through a line 62 with an output line 64 from a pump 66 having its intake line 68 connected with a reservoir of hydraulic fluid. The output line 64 from pump 66 is also connected with a line 70 to a pressure relief valve 72. Line 58 is connected through a branch line 74 with a relief valve 76. When relief valve 76 is forced open by the pressure in line 74 it connects line 74 with a discharge line 78 passing through a pressure actuated switch 80, and having a restriction 82 on the downstream side of switch 80. When valve 76 connects line 78 with line 74, the resulting pressure rise in line 78 causes the switch 80 to actuate a warning signal 84 which may be in the form of either a light or audible signal and the concave moves away from cylinder 18.

The pressure in lines 58 and 74 is determined by the force tending to pivot concave 20 in a counterclockwise direction about axis 22 to increase the spacing between the concave 20 and cylinder 18. Thus, in the event an obstruction is received between the concave and threshing cylinder sufficient to overload the threshing assembly, the pressure in lines 58 and 74 will suddenly increase to open valve 76 and actuate the warning device 84.

Valve 60 is a three-position valve having supply, neutral, and discharge positions, and is shown in FIG. 2 in its neutral position in which flow to and from the cylinder 38 through line 58 is blocked. Movement of valve 60 toward the right in FIG. 2 connects line 58 with a drain line 88 permitting piston 42 to move toward the right and retract ram 36 to permit the concave to pivot away from the threshing cylinder. Movement of valve 60 toward the left in FIG. 2 connects line 58 with the pump output through line 62 to thereby deliver hydraulic fluid to cylinder 38 and extend ram 36 to decrease the spacing between the concave and threshing cylinder. Valve 60 is manually actuated by a lever 85 fulcrumed at 86.

In operation, valve 60 is actuated by lever 85 to adjust the concave to the desired position as indicated by pointer 50. The operator can adjust the setting of the concave in accordance with varying conditions during operation if desired by manipulating lever 85. Should overload occur, the warning signal 84 will be actuated by the opening of check valve 76, and the operator can move lever 85 counterclockwise about fulcrum 86 to shift valve 60 to its discharge position thereby connecting line 58 with drain line 88 and permitting the concave to move rapidly away from the threshing cylinder. When the obstruction causing the overload is removed from between the concave and cylinder, the operator can actuate the valve to its delivery position thereby connecting lines 58 and 62 until the concave returns to its desired operating position.

Figure 3:
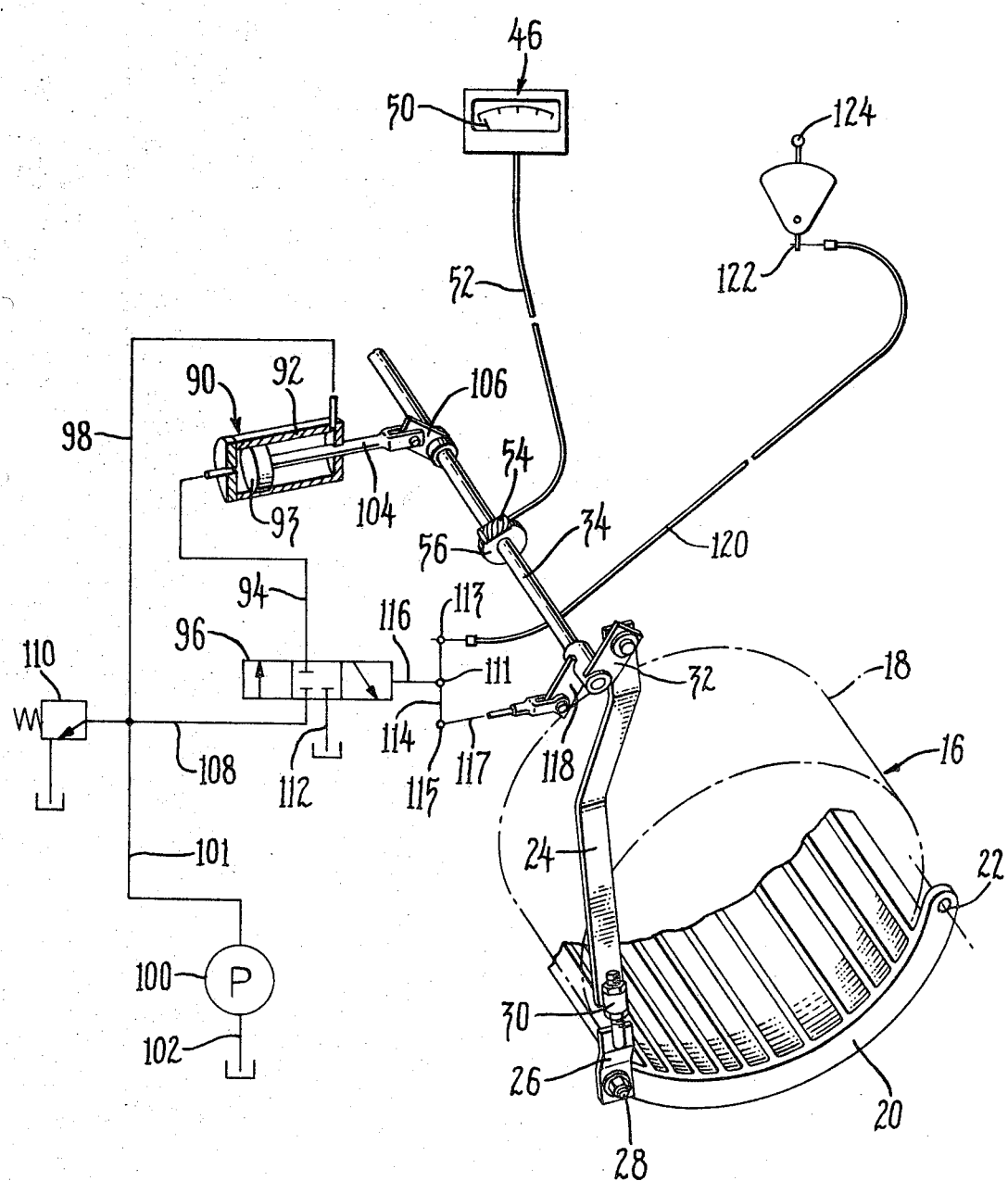
FIG. 3 is a view similar to FIG. 2 of a second embodiment of the threshing mechanism.

In the FIG. 3 embodiment, concave 20 is raised and lowered by a hydraulic ram 90 including a hydraulic cylinder 92 and a piston 93 reciprocable therein. The hydraulic cylinder is connected on one side of piston 93 through a line 94 with a three-position control valve 96, and is connected on the other side of piston 93 through a line 98 with the output line 101 of a pump 100 having an intake line 102 connected with a reservoir of hydraulic fluid. Piston 93 has its rod 104 pivotally connected with a lever arm 106 nonrotatably mounted on shaft 34 such that reciprocation of piston 93 within cylinder 92 causes rotation of shaft 34 to thereby raise and lower concave 20.

Pump 100 delivers hydraulic fluid through lines 98 and through a line 108 intersecting line 98 and connected at one end with the control valve 96 and at its other end with a relief valve 110. Relief valve 110 controls the maximum pressure in lines 98 and 108. Control valve 96 is further connected with a drain line 112 to the reservoir or sump.

Control valve 96 is shown in its neutral position in FIG. 3 in which hydraulic fluid is trapped in line 94 between piston 93 and valve 96, and flow is blocked from line 108 to line 94 through valve 96 with the result that pump 100 delivers fluid through line 98 to the hydraulic cylinder 92 to maintain the piston in the position shown with excess pressure being bled off through relief valve 110.

If control valve 96 is moved to the right from the neutral position, that is to its supply position, line 108 connects with line 94 and the pump delivers fluid through line 94. Since the area of piston 93 exposed to line 94 is greater than its area that is exposed to line 98, piston 93 will move toward the right to extend ram 90.

If control valve 96 is moved to the left from its neutral position, that is, to its discharge position, line 94 will connect with drain line 112, and the pressure in line 98 will therefore tend to move piston 93 to the left to retract the ram.

Valve 96 has an operating arm 116 pivotally connected at 111 with a floating lever 114. One end of lever 114 is pivotally connected at 115 with one end of a link 117, the other end of link 117 being pivotally connected with a lever 118 nonrotatably secured to shaft 34. The other end of the floating lever 114 is connected at 113 with a flexible control wire or cable assembly 120. The control cable has its other end connected at 122 with one end of an operating lever 124 mounted adjacent the operator's station.

Movement of lever 124 to the left, or counterclockwise, causes the upper end of lever 114 at connection 113 to move to the left and connect line 94 with drain line 112. As a consequence, piston 93 will move to the left causing counterclockwise rotation of shaft 34 to move the concave 20 upwardly toward threshing cylinder 18. As shaft 34 rotates counterclockwise, link 117 causes the lower end of lever 114 at connection 115 to move to the right until valve 96 returns to its neutral position. Conversely, clockwise movement of lever 124 moves the upper end of lever 114 at connection 113 to the right to shift valve 96 to its supply position thereby connecting line 108 with line 94. Piston 93 will move to the right and lower concave 20, the resulting clockwise movement of shaft 34 causing the lower end of lever 114 to move to the left and return valve 96 to its neutral position.

In operation of the FIG. 3 embodiment, operating lever 124 is moved by the operator to a position that will cause the concave to assume a desired position relative to the threshing cylinder as indicated by pointer 50. During threshing operations, the normal forces acting on concave 20 tending to move the concave away from the threshing cylinder are counteracted by hydraulic pressure in line 98. However, should overload occur due to the ingestion of a foreign object or a large slug of crop material, the hydraulic pressure in line 98 will be overcome and shaft 34 will rotate in a clockwise direction. As a result, link 117 will move the lower end of lever 114 to the left and connect line 94 with drain line 112 relieving any suction on the left face of piston 93. Piston 93 will move to the right so long as the overload forces exceed the force on piston 93 of hydraulic pressure in line 98, and relief valve 110 will remain open until the overload condition is relieved by the passage or removal of the excessive material from between the threshing cylinder and concave. However, as soon as the forces return to normal, the pressure from line 98 will cause piston 93 to move to the left until the followup movement of link 117 returns control valve 96 to its neutral position. When control valve 96 returns to its neutral position, concave 20 will have returned to its original operating position in accordance with the position of operating lever 124.

While specific examples of the invention have been illustrated and described, it should be understood that the invention is not limited to the exact construction shown but that various alterations in the construction and arrangement of parts is possible without departing from the scope and spirit of the invention.

I claim:

1. Threshing apparatus including a rotatable threshing cylinder, a concave mounted beneath the threshing cylinder for movement toward and away from the threshing cylinder to respectively decrease and increase the space between the concave and threshing cylinder, a hydraulic actuator for controlling the concave such that the delivery of hydraulic fluid to the actuator tends to move the concave in one direction relative to the threshing cylinder and the exhaust of hydraulic fluid from the actuator tends to move the concave in the opposite direction relative to the concave, and a movable control valve having supply, discharge and neutral conditions to respectively establish delivery of hydraulic fluid to the actuator, exhaust hydraulic fluid from the actuator, and block flow of hydraulic fluid to and from the actuator.

2. Threshing apparatus as claimed in claim 1 wherein the delivery of hydraulic fluid to the actuator tends to move the concave toward the threshing cylinder to decrease the space between the concave and threshing cylinder, and further including relief valve means between said hydraulic actuator and said relief valve operable in response to excessive loads between the concave and threshing cylinder to connect the actuator with sump.

3. Threshing apparatus as claimed in claim 2 further including a signal, and means responsive to flow through said relief valve means for actuating said signal.

4. Threshing apparatus as claimed in claim 2 further including followup means interconnected between the concave and the control valve for actuating the control valve from its neutral to discharge condition in response to excessive loads between the concave and threshing cylinder, and thereafter to cause the control valve to return to the neutral position when the excessive loads are relieved.

5. Threshing apparatus as claimed in claim 1 further including a concave position selector lever connected with said control valve operable to actuate the control valve to move the concave to a selected operating position relative to the threshing cylinder, and followup means interconnected between the control valve and concave operable to move the control valve to its neutral position as the concave assumes said selected position.

6. Threshing apparatus as claimed in claim 1 further including an operating arm on the control valve, a floating lever pivotally mounted intermediate its ends on said operating arm, followup means connected with one end of said floating lever, said followup means being movable in opposite directions in response to movement of the concave in opposite directions, and concave position selector means connected with the other end of said floating lever for positioning said other end in accordance with a selected position of the concave relative to the threshing cylinder.

7 Threshing apparatus including a threshing drum; a concave mounted adjacent the threshing drum for movement toward and away from the threshing drum to respectively decrease and increase the space between the concave and threshing drum; power means for controlling the position of the concave relative to the threshing drum; and movable control means for said power means having a first position to condition the power means in a direction to effect movement of the concave toward the threshing drum, a second position to condition the power means to maintain the concave in a fixed position relative to the threshing drum, and a third position to condition the power means in a direction to effect movement of the concave away from the threshing drum.

8. Threshing apparatus as claimed in claim 7 further including means responsive to a predetermined increase in the load between the concave and threshing drum to allow movement of the concave upon said predetermined increase in load when said control means is in said second position.

9. Threshing apparatus including a rotatable threshing cylinder, a concave mounted beneath the threshing cylinder for movement toward and away from the threshing cylinder to respectively decrease and increase the space between the concave and threshing cylinder; an actuator for controlling the concave including a hydraulic cylinder, a piston reciprocable in the hydraulic cylinder and having a rod projecting from one end of the hydraulic cylinder; linkage means connecting the piston rod with the concave so that the concave moves away from the threshing cylinder as the piston rod projects from the hydraulic cylinder and moves toward the threshing cylinder as the piston rod retracts within the hydraulic cylinder; a pump; a first line connecting the pump output with the end of the hydraulic cylinder through which the piston rod projects; a second line connected with the end of the hydraulic cylinder opposite the piston rod; and a movable control valve having a supply position in which said second line is connected with the pump output, a neutral position in which fluid is trapped in said second line, and a discharge position in which said second line is connected with a sump.

10. Threshing apparatus as claimed in claim 9 further including a relief valve operable in response to increases beyond a predetermined maximum pressure in said first line to connect said first line with sump until the pressure falls below said predetermined maximum.

11. Threshing apparatus as claimed in claim 10 further including means for actuating said control valve to its supply or discharge positions to effect movement of the concave to a selected position relative to the threshing cylinder, said means causing said control valve to assume its neutral position as the concave assumes said selected position.

12. Threshing apparatus as claimed in claim 11 wherein said means includes followup mechanism operable to actuate said control valve in a direction to effect return movement of the concave to said selected position subsequent to movement of said concave away from selected position due to overload.